(12) United States Patent
Lu et al.

(10) Patent No.: US 9,665,229 B2
(45) Date of Patent: May 30, 2017

(54) DISPLAY PANEL AND DISPLAY DEVICE

(71) Applicants: Shanghai Tianma Micro-Electronics Co., Ltd., Shanghai (CN); Tianma Micro-Electronics Co., Ltd., Shenzhen (CN)

(72) Inventors: Feng Lu, Shanghai (CN); Zhongshou Huang, Shanghai (CN); Xianxiang Zhang, Shanghai (CN); Xiaoye Li, Shanghai (CN); Gang Liu, Shanghai (CN); Yingying Xu, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 14/951,461

(22) Filed: Nov. 24, 2015

(65) Prior Publication Data
US 2016/0188089 A1 Jun. 30, 2016

(30) Foreign Application Priority Data
Dec. 31, 2014 (CN) .......................... 2014 1 0855409

(51) Int. Cl.
*G06F 3/045* (2006.01)
*G06F 3/044* (2006.01)
*G06F 3/041* (2006.01)

(52) U.S. Cl.
CPC ............ *G06F 3/044* (2013.01); *G06F 3/0412* (2013.01); *G06F 2203/04103* (2013.01)

(58) Field of Classification Search
CPC ............................... G06F 3/044; G06F 3/0416
(Continued)

(56) References Cited

U.S. PATENT DOCUMENTS

2009/0278813 A1* 11/2009 Wijaya .................... G06F 3/041
345/173
2013/0044074 A1* 2/2013 Park ..................... G02F 1/13338
345/174
(Continued)

FOREIGN PATENT DOCUMENTS

CN ZL2010101809509 B 1/2013
CN 103019447 A 4/2013
(Continued)

*Primary Examiner* — Calvin C Ma
(74) *Attorney, Agent, or Firm* — Faegre Baker Daniels LLP (57) ABSTRACT

A display panel and a display device are disclosed. The display panel includes a color filter substrate and an array substrate disposed opposite to each other and a liquid crystal layer located therebetween; the color filter substrate includes a plurality of touch drive electrodes parallelly arranged along a first direction; the array substrate comprises two groups of waveform generation circuits, which are respectively arranged at both ends of the touch drive electrodes, located in a frame area of the array substrate, where each group of waveform generation circuits comprises a plurality of touch drive waveform generation circuits, the touch drive electrode is electrically connected with one or more of the touch drive waveform generation circuits, and the plurality of touch drive waveform generation circuits are configured for generating touch drive signals and providing the generated touch drive signals to the touch drive electrodes.

21 Claims, 10 Drawing Sheets

(58) Field of Classification Search
USPC .................................. 345/173, 174; 349/12
See application file for complete search history.

(56) References Cited

U.S. PATENT DOCUMENTS

| | | |
|---|---|---|
| 2013/0307820 A1 | 11/2013 | Kim |
| 2014/0184940 A1* | 7/2014 | Ma .................... G02F 1/13338 349/12 |
| 2014/0184942 A1* | 7/2014 | Bang .................. G02F 1/13338 349/12 |

FOREIGN PATENT DOCUMENTS

| | | |
|---|---|---|
| CN | 103034366 A | 4/2013 |
| CN | 103197819 A | 7/2013 |
| CN | 103901650 A | 7/2014 |

* cited by examiner

Related Art

DISPLAY PANEL AND DISPLAY DEVICE

CROSS-REFERENCE TO RELATED APPLICATION

This application claims priority to Chinese Application No. 201410855409.1, filed Dec. 31, 2014, which is herein incorporated by reference in its entirety.

TECHNICAL FIELD

The present disclosure relates to the field of display technologies and, in particular, to a display panel and a display device.

BACKGROUND

With the development of modern electronic technology, one or more components will be disposed in a display panel of a display device to achieve a corresponding function, such as a capacitive touch control function, in order to bring convenience to a user.

In the related art, in order to achieve the capacitive touch control function, touch detection electrodes are generally disposed at a side of a color filter substrate away from an array substrate, and a common electrode disposed in the array substrate may be used as a touch drive electrode, namely, at a display state, the common electrode is used for receiving a common voltage signal, and at a touch state, the common electrode is used as a touch drive electrode for receiving a touch drive signal.

Figure 1:
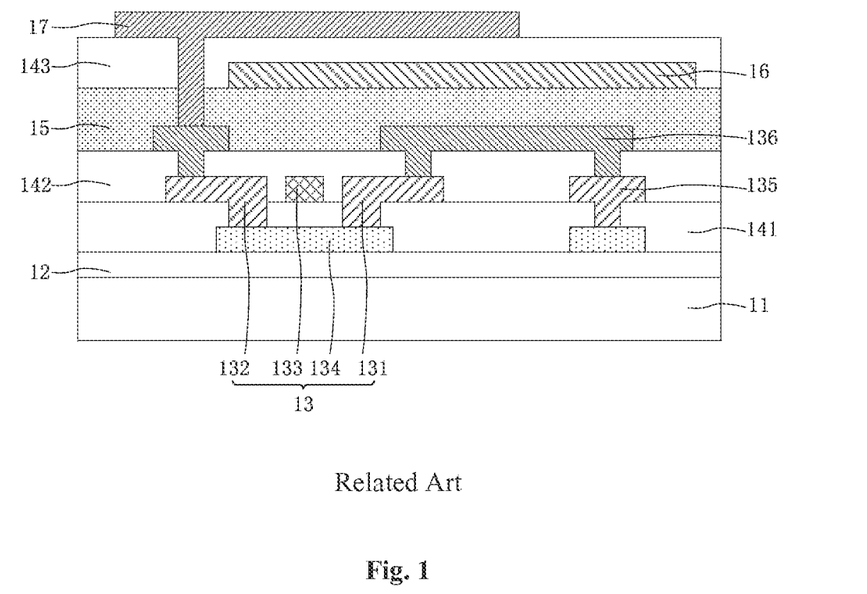
FIG. 1 is a schematic diagram of a structure of an array substrate in the related art.

FIG. 1 is a schematic diagram of a structure of an array substrate in the related art. As shown in FIG. 1, the array substrate in which a common electrode may be used as a touch drive electrode includes: a glass substrate 11; an intermediate layer 12 located on the glass substrate 11; a thin-film transistor (TFT) 13 disposed on the intermediate layer 12, where the thin-film transistor 13 includes a source electrode 131, a drain electrode 132, a gate electrode 133 and a polysilicon layer 134, the gate electrode 133 is electrically insulated from the polysilicon layer 134 by a first passivation layer 141, the gate electrode 133 is electrically insulated from the source electrode 131 and the drain electrode 132 by a second passivation layer 142, and the source electrode 131 is electrically connected with a data line 135 through a first metal 136; an organic film layer 15 located on the second passivation layer 142; a common electrode 16 located on the organic film layer 15; and a pixel electrode 17 located on the common electrode 16, where the common electrode 16 is electrically insulated from the pixel electrode 17 by a third passivation layer 143, and the common electrode 16 is used as a touch drive electrode at a touch state.

As shown in FIG. 1, the common electrode 16, which is made of transparent conductive material, is planar and hence has relatively large resistance; moreover, an area of the common electrode 16 that faces the source electrode 131 of the thin-film transistor 13 as well as the first metal 136 is large, thus a large load capacitance is formed, so that the product of the resistance of the touch drive electrode and the load capacitance is large, resulting in a long charging time for a touch drive signal. To solve the problem, the driving capability of the touch drive signal is required to be reinforced, accordingly a larger touch drive waveform generation circuit used for generating the touch drive signal is required at the frame area of the array substrate, as a result, a display panel using such an array substrate has a wider, non-narrow frame.

SUMMARY

In view of this, embodiments of the disclosure provide a display panel and a display device.

In a first example, embodiments of the disclosure provide a display panel, including a color filter substrate, an array substrate disposed opposite to the color filter substrate and a liquid crystal layer located between the color filter substrate and the array substrate, where the color filter substrate includes a plurality of touch drive electrodes, and the plurality of touch drive electrodes are parallelly arranged along a first direction; the array substrate comprises two groups of waveform generation circuits located in a frame area of the array substrate, and the two groups of waveform generation circuits are respectively arranged at both ends of the touch drive electrodes, where each group of waveform generation circuits comprises a plurality of touch drive waveform generation circuits, the touch drive electrode is electrically connected with one or more of the touch drive waveform generation circuits, and the plurality of touch drive waveform generation circuits are configured for generating touch drive signals and providing the generated touch drive signals to the touch drive electrodes.

In a second example, embodiments of the disclosure provide a display device, including the display panel in the above-mentioned first example.

While multiple embodiments are disclosed, still other embodiments of the disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

Other characteristics, purposes and advantages of the disclosure will become apparent from the detailed description of non-limiting embodiments made with reference to the accompanying drawings, in which.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

The disclosure will be further described below in detail in combination with the accompanying drawings and embodiments. It should be appreciated that the specific embodiments described herein are merely used for explaining the disclosure but are not intended to limit the disclosure. In addition, it should be noted that only parts of but not all content of the disclosure are shown in the accompanying drawings for the sake of description.

Figure 2:
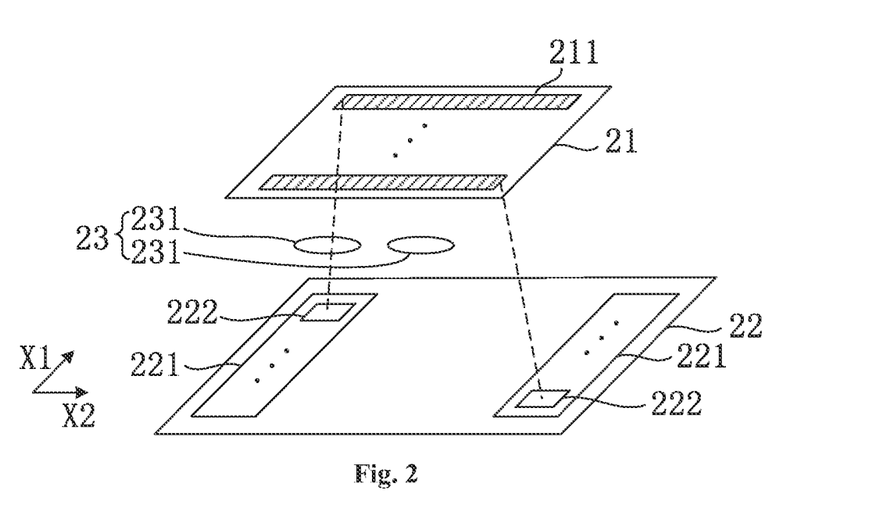
FIG. 2 is a schematic diagram of a structure of a display panel, according to embodiments of the disclosure.

Embodiments of the disclosure provide a display panel. FIG. 2 is a schematic diagram of a structure of the display panel, according to embodiments of the disclosure. As shown in FIG. 2, the display panel includes a color filter substrate 21, an array substrate 22 disposed opposite to the color filter substrate 21, and a liquid crystal layer 23 located between the color filter substrate 21 and the array substrate 22, where the liquid crystal layer 23 includes a plurality of liquid crystal molecules 231, and the color filter substrate 21 includes a plurality of touch drive electrodes 211 which are parallelly arranged along a first direction X1, with the touch drive electrodes 211 extending in a direction X2; the array substrate 22 includes two groups of waveform generation circuits 221 located in the frame area of the array substrate 22, and the two groups of waveform generation circuits 221 are respectively disposed at both ends of the touch drive electrode 211, where each of the two groups of waveform generation circuits 221 includes a plurality of touch drive waveform generation circuits 222, the touch drive electrode 211 is electrically connected with one or more of the touch drive waveform generation circuits 222 (as shown in FIG. 2, the electrical connections are represented by dotted lines connecting the touch drive electrodes 211 with the touch drive waveform generation circuits 222), and the plurality of touch drive waveform generation circuits 222 are configured to generate touch drive signals and provide the generated touch drive signals to the touch drive electrodes 211.

At present, in order to achieve the capacitive touch control function, a common electrode disposed in the array substrate is generally also used as the touch drive electrode. Since an area of the common electrode that faces the source electrode of a thin-film transistor disposed in the array substrate and a first metal for electrically connecting the source electrode with a data line is large, a large load capacitance is formed, so that the product of the resistance of the touch drive electrode and the load capacitance is large, resulting in a long charging time for the touch drive signal. To solve the problem, the driving capability of the touch drive signal is reinforced, accordingly a large touch drive waveform generation circuit used for generating the touch drive signal is required at the frame area of the array substrate and occupies a large area of the frame area. As a result, the corresponding display panel has a wider, non-narrow frame.

According to the above-mentioned technical solution of the present disclosure, the distance between the touch drive electrode and the source electrode of the thin-film transistor as well as the first metal arranged in the array substrate is increased by arranging the touch drive electrode in the color filter substrate. Accordingly the resultant load capacitance is decreased, so that the product of the resistance of the touch drive electrode and the load capacitance is decreased, achieving a shortened charging time for the touch drive signal. Accordingly it is unnecessary to dispose a large touch drive waveform generation circuit in the frame area. In this way, the area of the frame area can be decreased, so that it is easy to achieve a narrow frame of the display panel. Further, two groups of waveform generation circuits are disposed in the frame area of the array substrate and are respectively disposed at both ends of the touch drive electrodes, where each group of waveform generation circuits includes a plurality of touch drive waveform generation circuits, so that the area of the frame area can be further decreased. Thus it becomes easier to achieve the narrow frame of the display panel.

Some embodiments of disposing the touch drive electrodes 211 on the color filter substrate 21 are described below.

Figure 3A:
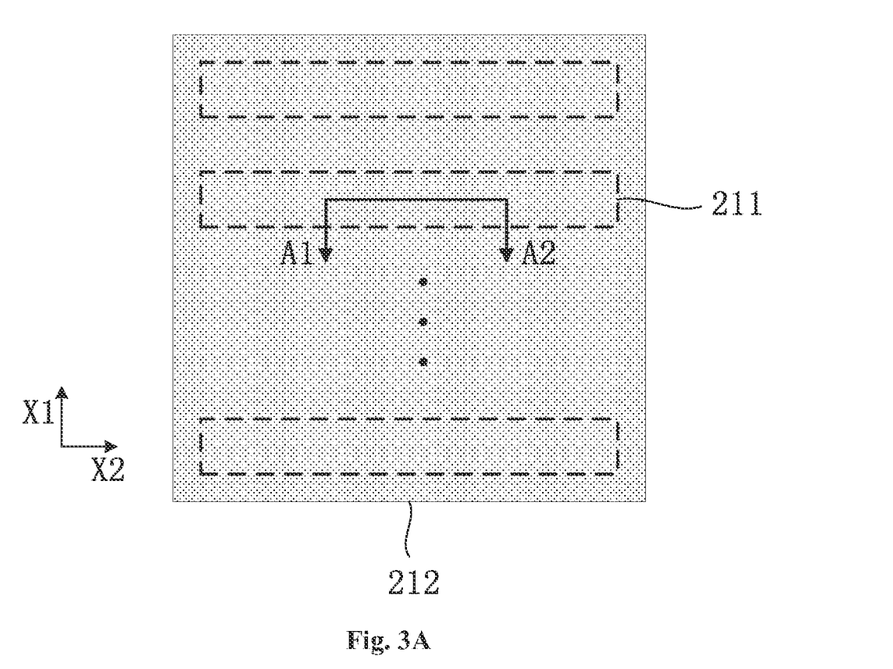
FIG. 3A is a schematic diagram of a structure of a color filter substrate, according to embodiments of the disclosure.
Figure 3B:
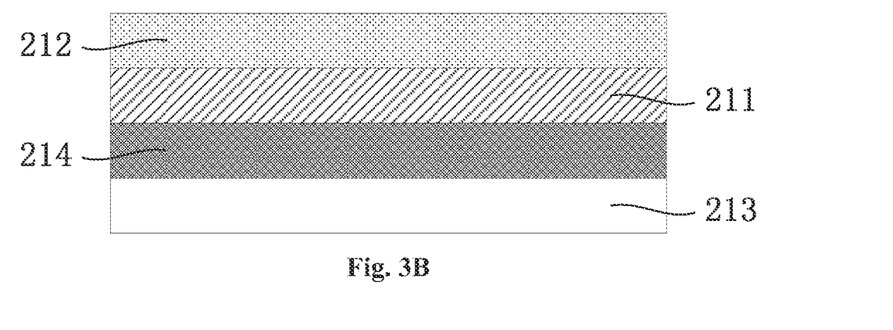
FIG. 3B is a schematic diagram of a section of the color filter substrate taken along a direction A1-A2 in FIG. 3A.

FIG. 3A is a schematic diagram of a structure of a color filter substrate, according to embodiments of the disclosure. As shown in FIG. 3A, the color filter substrate further includes a black matrix (not shown in FIG. 3A) and a color filter layer 212, in addition to the plurality of touch drive electrodes 211 sequentially arranged along the first direction X1. FIG. 3B is a schematic diagram of a section of the color filter substrate along a direction A1-A2 in FIG. 3A. As shown in FIG. 3B, the color filter substrate further includes a first substrate 213; a black matrix 214 disposed on the first substrate 213, where the touch drive electrode 211 is arranged at a side of the black matrix 214 away from the first substrate 213; and the color filter layer 212 disposed at a side of the touch drive electrode 211 away from the first substrate 213. For a structure of the color filter substrate in FIG. 3A, as shown in FIG. 3B, the touch drive electrode 211 is disposed between the color filter layer 212 and the black matrix 214.

Figure 3C:
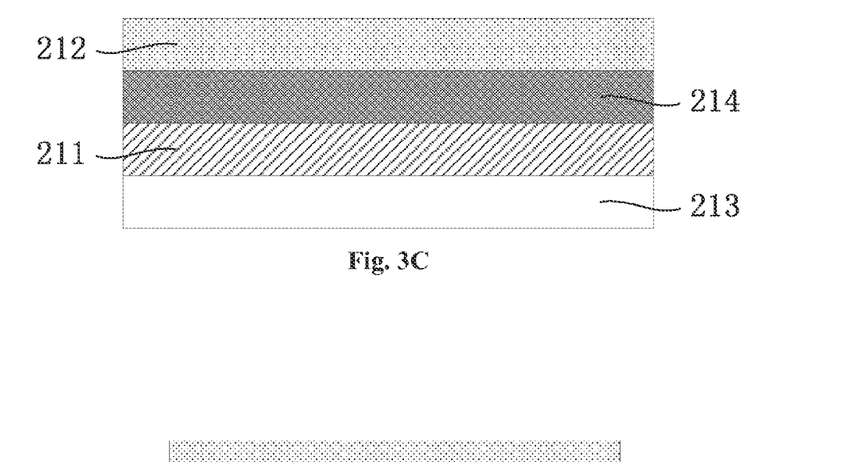
FIG. 3C is a schematic diagram of another section of the color filter substrate taken along the direction A1-A2 in FIG. 3A.

FIG. 3C is a schematic diagram of another section of the color filter substrate along the direction A1-A2 in FIG. 3A. As shown in FIG. 3C, the touch drive electrode 211 is disposed on the first substrate 213, and the black matrix 214 and the color filter layer 212 are sequentially disposed at the side of the touch drive electrode 211 away from the first substrate 213. For another structure of the color filter substrate in FIG. 3A, as shown in FIG. 3C, the touch drive electrode 211 is disposed on a surface of the black matrix 214 at the side of the black matrix 214 away from the color filter layer 212.

Figure 4A:
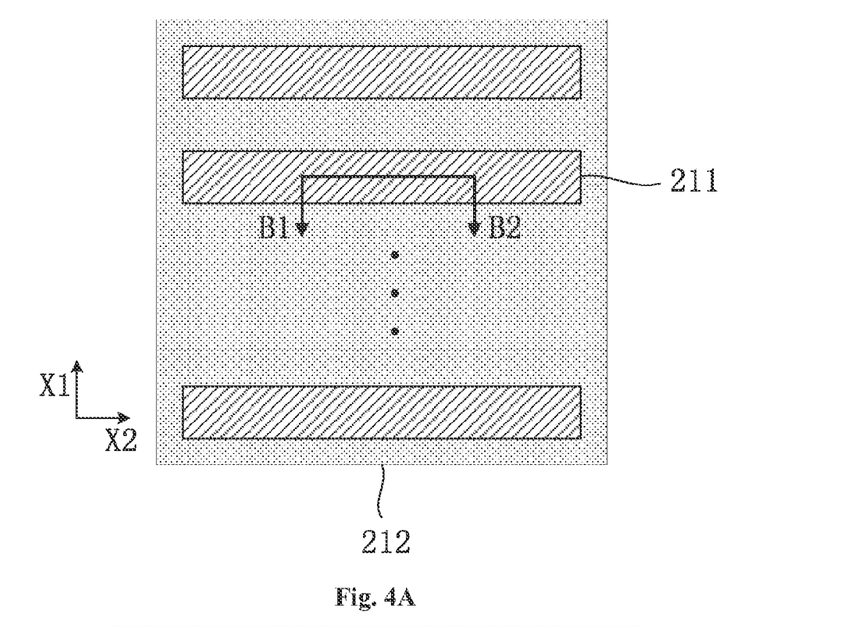
FIG. 4A is a schematic diagram of a structure of another color filter substrate, according to embodiments of the disclosure.
Figure 4B:
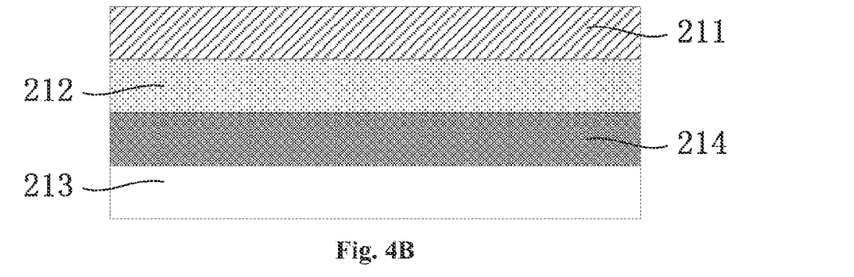
FIG. 4B is a schematic diagram of a section of the color filter substrate taken along a direction B1-B2 in FIG. 4A.

FIG. 4A is a schematic diagram of a structure of another color filter substrate, according to embodiments of the disclosure. As shown in FIG. 4A, the color filter substrate further includes a black matrix (not shown in FIG. 4A) and a color filter layer 212, in addition to a plurality of the touch drive electrodes 211 arranged along the first direction X1. FIG. 4B is a schematic diagram of a section of the color filter substrate along a direction B1-B2 in FIG. 4A. As shown in FIG. 4B, the black matrix 214 is disposed on the first substrate 213, the color filter layer 212 is disposed at a side of the black matrix 214 away from the first substrate 213, and the touch drive electrode 211 is disposed on a surface of the color filter layer 212 at the side of the color filter layer 212 away from the black matrix 214.

As shown in FIG. 2, FIG. 3A and FIG. 4A, the touch drive electrode 211 has a bar shape. Correspondingly, the touch drive electrode 211 can be made of transparent conductive material, such as Indium Tin Oxide (ITO), Indium Zinc Oxide (IZO), or a combination of the above.

Figure 5A:
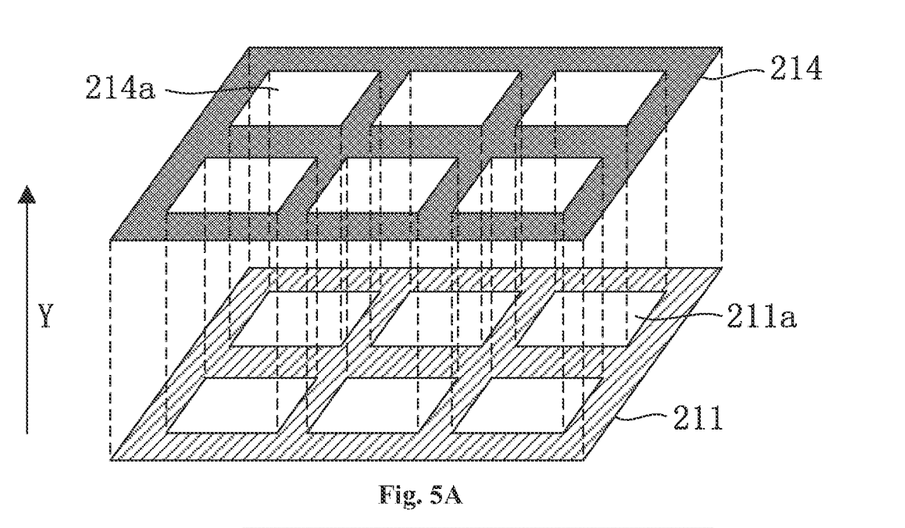
FIG. 5A is a schematic diagram of a structure of another color filter substrate, according to embodiments of the disclosure.

In addition to the bar shape of the touch drive electrode 211, the touch drive electrode may have a grid shape. As shown in FIG. 5A, the color filter substrate includes a black matrix 214, the touch drive electrode 211 has a grid shape, and in a light transmitting direction Y, the projection of the black matrix 214 covers the projection of the touch drive electrode 211. As shown in FIG. 5A, the touch drive electrode 211 is located beneath the black matrix 214 in the light transmitting direction Y. However, in another example, as shown in FIG. 5B, the touch drive electrode 211 has a grid shape, and in the light transmitting direction Y, the projection of the black matrix 214 covers the projection of the touch drive electrode 211, and the touch drive electrode 211 is located above the black matrix 214 in the light transmitting direction Y.

Figure 5B:
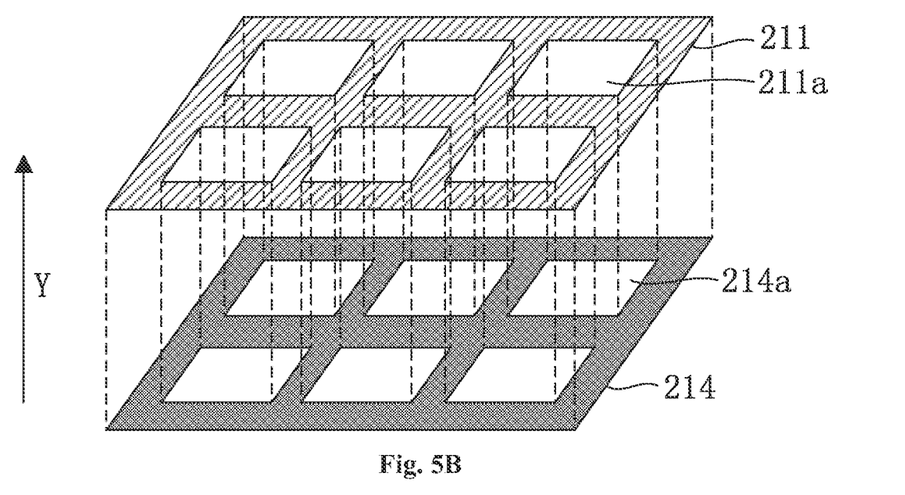
FIG. 5B is a schematic diagram of a structure of another color filter substrate, according to embodiments of the disclosure.
Figure 5C:
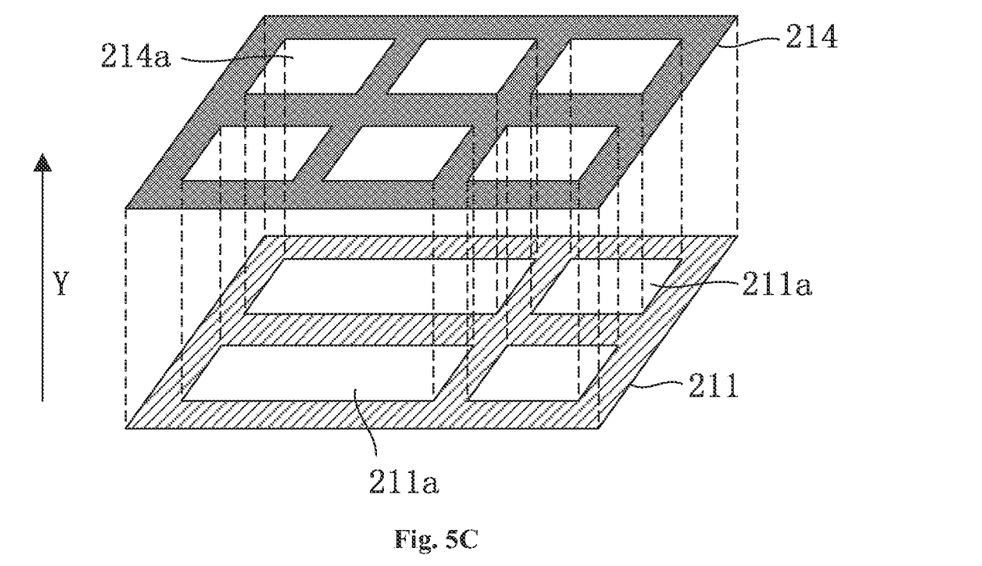
FIG. 5C is a schematic diagram of a structure of another color filter substrate, according to embodiments of the disclosure.

As shown in FIG. 5A and FIG. 5B, each grid unit 211a of the touch drive electrode 211 surrounds one opening 214a of the black matrix 214, but this is merely some examples of the arrangement of the grid-shaped touch drive electrode 211. In another example, as shown in FIG. 5C, the projection of the black matrix 214 covers the projection of the touch drive electrode 211 and the touch drive electrode 211 is located beneath the black matrix 214 in the light transmitting direction Y. A part of the grid units 211a of the touch drive electrode 211 each surround one opening 214a of the black matrix 214, and another part of the grid units 211 a may each surround two openings 214a of the black matrix 214. It should be noted that, FIGS. 5A to 5C merely illustrate some examples of the grid-shaped touch drive electrode 211. In other examples, each grid unit of the touch drive electrode 211 can surround a plurality of openings of the black matrix, or each grid unit of the touch drive electrode 211 may surround a different number of openings of the black matrix, or a part of the grid units each surround the same number of openings of the black matrix and the rest of the grid units each surround a different number of openings of the black matrix, and so on, as long as the touch drive electrode 211 has a grid shape, and the projection of the black matrix 214 covers the projection of the touch drive electrode 211 in the light transmitting direction.

Compared with the bar-shaped touch drive electrode 211, an area of the grid-shaped touch drive electrode 211, which faces the source electrode of a thin-film transistor as well as a first metal for electrically connecting the source electrode with a data line in the array substrate, is small, resulting in small load capacitance, so that the product of the resistance of the touch drive electrode and the load capacitance is decreased, thus shortening the charging time for the touch drive signal. Accordingly, the touch drive waveform generation circuit can be smaller, and in this way, the area of the frame area can be further decreased, so that it is easier to achieve the narrow frame of the display panel.

The grid-shaped touch drive electrode 211 can be made of metal material or transparent conductive material. The grid-shaped touch drive electrode 211 can be made of metal material. Since the resistance of the metal material is smaller than that of the transparent conductive material, the product of the resistance of the touch drive electrode and the load capacitance can be further decreased if the touch drive electrode 211 is made of the metal material, so that the charging time for the touch drive signal can be further shortened.

As shown in FIG. 2, the plurality of touch drive waveform generation circuits 222 in each group of waveform generation circuits 221 are parallelly arranged along the first direction X1, and each of the touch drive waveform generation circuits 222 extends along the extension direction X2 of the touch drive electrode 211 to be electrically connected with the touch drive electrode 211.

By taking the bar-shaped touch drive electrode as an example, embodiments of an electric connection of the touch drive electrode 211 with the touch drive waveform generation circuit 222 are given below. Moreover, the following embodiments are also applicable to the grid-shaped touch drive electrode 211.

Figure 6A:
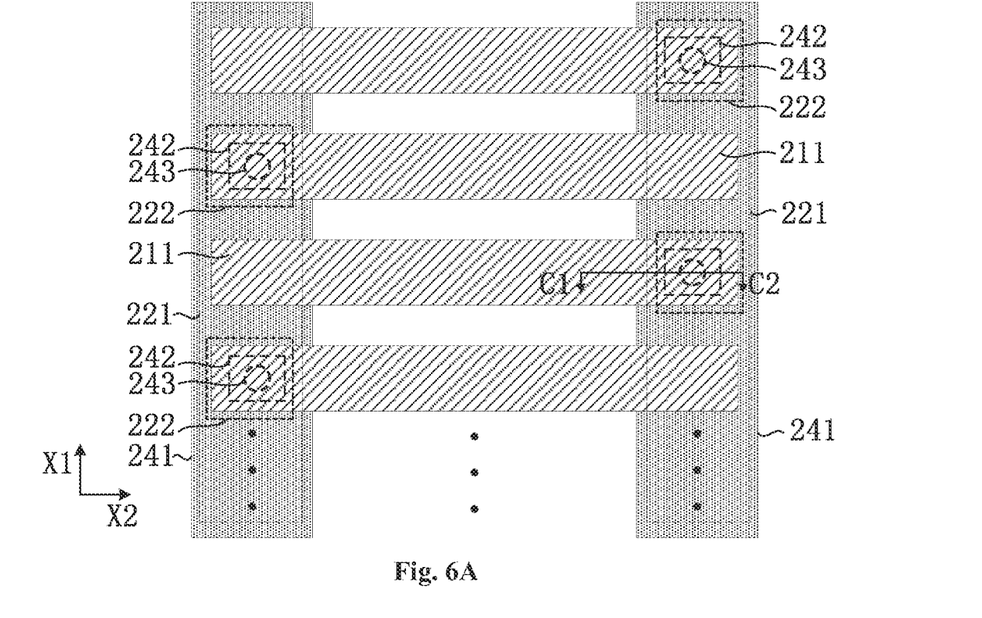
FIG. 6A is a schematic diagram of a structure of another display panel, according to embodiments of the disclosure.

In the display panel as shown in FIG. 6A, each of a plurality of touch drive electrodes 211 is connected with one touch drive waveform generation circuit 222, and a plurality of the touch drive waveform generation circuits 222 generate identical touch drive signals. Here, the touch drive waveform generation circuits 222 are parallelly arranged along the first direction X1, and each touch drive waveform generation circuit 222 extends along the extension direction X2 of the touch drive electrode 211.

Figure 6B:
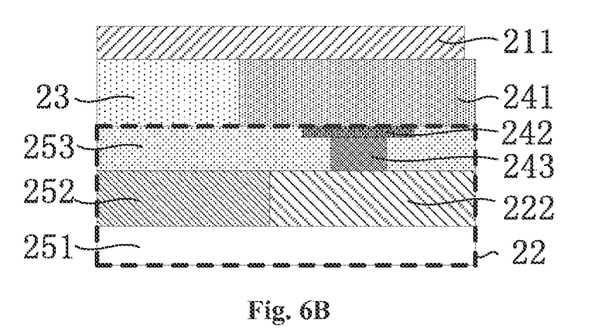
FIG. 6B is a schematic diagram of a section of the display panel taken along a direction C1-C2 in FIG. 6A.

FIG. 6B is a schematic diagram of a section of the display panel along a direction C1-C2 in FIG. 6A. As shown in FIG. 6A and FIG. 6B, the touch drive electrode 211 is electrically connected, through conductive frame adhesive 241, with a touch drive waveform output end 242 disposed at the side of the array substrate 22 and located above the touch drive waveform generation circuit 222, and the touch drive waveform output end 242 is electrically connected with the touch drive waveform generation circuit 222 through a via hole 243. As shown in FIG. 6B, the array substrate 22 further includes a second substrate 251 and a thin-film transistor film layer 252 arranged on the second substrate 251. The touch drive waveform generation circuit 222 and the thin-film transistor film layer 252 are disposed on the same layer, further the touch drive waveform generation circuit 222 can be formed with thin-film transistors, thus the touch drive waveform generation circuit 222 and the thin-film transistor film layer 252 can be manufactured in the same manufacturing process, thereby not only reducing the manufacturing procedures of the array substrate, but also reducing the production cost.

In addition, as shown in FIG. 6B, in the array substrate 22, a first insulating layer 253 is disposed above the thin-film transistor film layer 252 and the touch drive waveform generation circuit 222; the liquid crystal layer 23 and the conductive frame adhesive 241 are disposed between the first insulating layer 253 and the touch drive electrode 211; the touch drive waveform output end 242 is disposed between the conductive frame adhesive 241 and the first insulating layer 253, the via hole 243 is disposed in the first insulating layer 253 and configured for electrically connecting the touch drive waveform generation circuit 222 with the touch drive waveform output end 242, and the conductive frame adhesive 241 is used for electrically connecting the touch drive electrode 211 with the touch drive waveform output end 242, so as to achieve the electric connection of the touch drive waveform generation circuit 222 and the touch drive electrode 211.

As shown in FIG. 6A, one touch drive electrode 211 forms a touch drive electrode group, namely, each group of touch drive electrodes includes one touch drive electrode 211. Within the two groups of waveform generation circuits 221 as shown in FIG. 6A, a group of waveform generation circuits 221 at the left side is electrically connected with even-numbered groups of touch drive electrodes, and a group of waveform generation circuits 221 at the right side is electrically connected with odd-numbered groups of touch drive electrodes.

Figure 7:
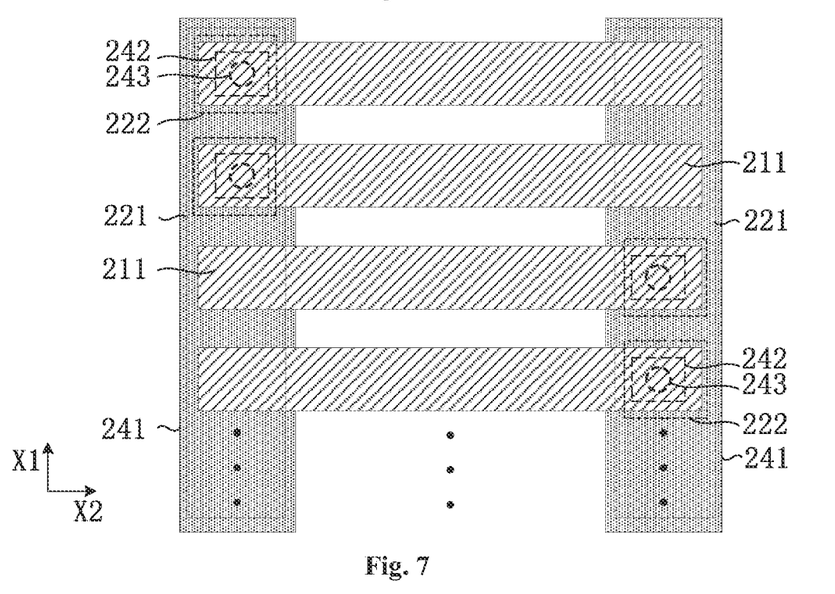
FIG. 7 is a schematic diagram of a structure of another display panel, according to embodiments of the disclosure.

As shown in FIG. 6A, one touch drive electrode 211 forms a touch drive electrode group. This is an example of the disclosure. In another example, as shown in FIG. 7, two touch drive electrodes 211 form a group of touch drive electrodes, where, within the two groups of waveform generation circuits 221, a group of waveform generation circuits 221 at the left side is electrically connected with odd-numbered groups of touch drive electrodes, and a group of waveform generation circuits 221 at the right side is electrically connected with even-numbered groups of touch drive electrodes. In other examples, a group of touch drive electrodes can also include more than two touch drive electrodes, or the number of the touch drive electrodes included in different groups of touch drive electrodes can also be different, and this is not limited herein.

It has been described in the above examples that each of the plurality of touch drive electrodes is electrically connected with one touch drive waveform generation circuit, this is merely some examples of electric connections between the touch drive electrodes and the touch drive waveform generation circuits in the disclosure. In the following examples, one touch drive electrode can also be electrically connected with a plurality of touch drive waveform generation circuits.

Figure 8A:
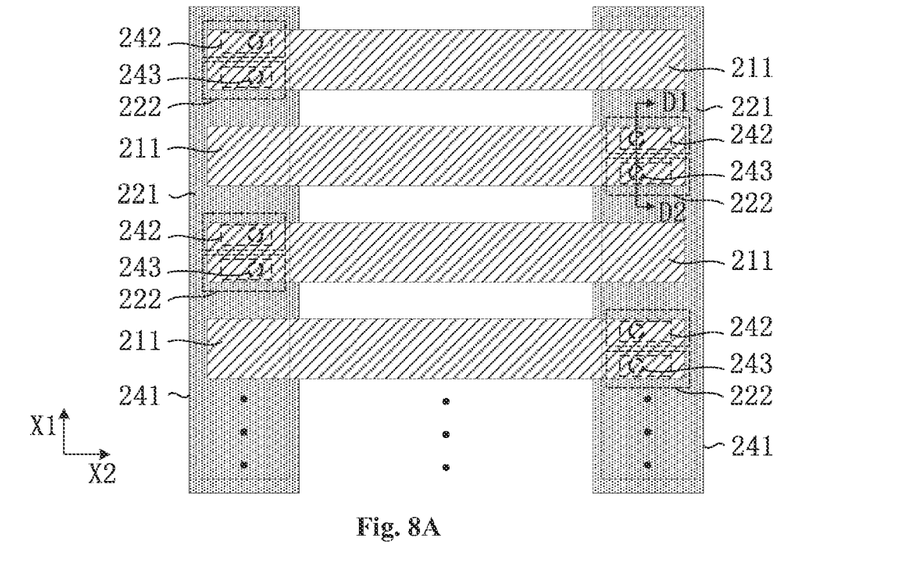
FIG. 8A is a schematic diagram of a structure of another display panel, according to embodiments of the disclosure.

As shown in FIG. 8A, each of a plurality of touch drive electrodes 211 is connected with two touch drive waveform generation circuits 222 configured to generate different touch drive signals, which may include touch drive signals with different waveforms or touch drive signals with waveforms of different phases. For example, the waveforms of the touch drive signals can be sine waves, square waves, triangle waves and the like.

In actual operation, the touch drive waveform generation circuits are controlled by an integrated circuit (IC) in the display panel. Considering that different ICs may provide different waveforms of the touch drive signals, each touch drive electrode is electrically connected to a number of touch drive waveform generation circuits for generating different touch drive signals, so that the compatibility of the display panel with different ICs is improved beneficially; in addition, since the different waveforms of the touch drive signals can achieve different touch effects and cause differences on indexes such as load and anti-noise capability, the same IC can directly switch between the different waveforms of the touch drive signals depending on different application environments, so as to achieve the effects of improving the signal to noise ratio and reducing the load.

Figure 8B:
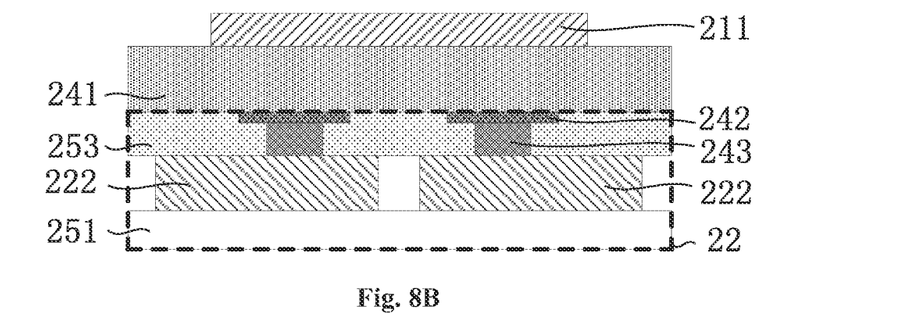
FIG. 8B is a schematic diagram of a section of the display panel taken along a direction D1-D2 in FIG. 8A.

FIG. 8B is a schematic diagram of a section of the display panel taken along a direction D1-D2 in FIG. 8A. As shown in FIG. 8A and FIG. 8B, the touch drive electrode 211 is electrically connected, through the conductive frame adhesive 241, with the touch drive waveform output end 242 disposed at the side of the array substrate 22 and located above the touch drive waveform generation circuit 222, and the touch drive waveform output end 242 is electrically connected with the touch drive waveform generation circuit 222 through the via hole 243. As shown in FIG. 8B, two touch drive waveform generation circuits 222 are disposed on the second substrate 251, the first insulating layer 253 is arranged on the touch drive waveform generation circuits 222, the conductive frame adhesive 241 is arranged between the touch drive electrode 211 and the first insulating layer 253, two touch drive waveform output ends 242 respectively corresponding to the touch drive waveform generation circuits 222 are arranged between the conductive frame adhesive 241 and the first insulating layer 253, two via holes 243 are arranged in the first insulating layer 253, the two touch drive waveform generation circuits 222 are respectively connected electrically with the touch drive waveform output ends 242 through the corresponding via holes 243, and the two touch drive waveform output ends 242 are electrically connected with one corresponding touch drive electrode 211 through the conductive frame adhesive 241, in this way, the electric connection between the one touch drive electrode 211 and the two touch drive waveform generation circuits 222 is implemented.

Figure 9:
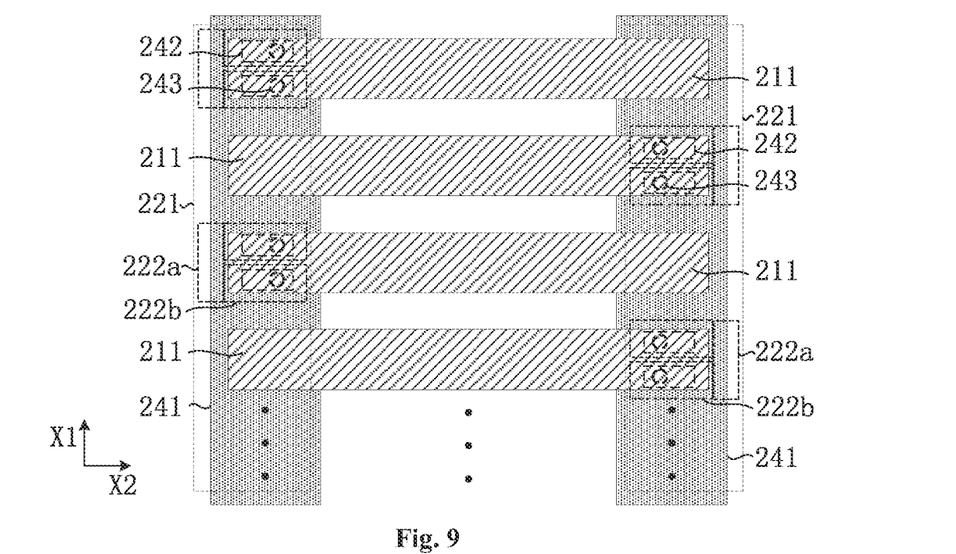
FIG. 9 is a schematic diagram of a structure of another display panel, according to embodiments of the disclosure.

As shown in FIG. 8A, the two touch drive waveform generation circuits 222 connected with each touch drive electrode 211 are located at one end of the touch drive electrode 211. Further, as shown in FIG. 9 based on FIG. 8A, the two touch drive waveform generation circuits 222 connected with each touch drive electrode 211 include a shared touch drive waveform generation sub-circuit 222a. The shared touch drive waveform generation sub-circuit 222a includes parts of the same function from the two touch drive waveform generation circuits 222, and parts with different functions respectively form individual touch drive waveform generation sub-circuits 222b. Since the parts with the same function from the two touch drive waveform generation sub-circuits are extracted to form the shared touch drive waveform generation sub-circuit 222a, the touch drive waveform generation circuit can be made more compact to facilitate the narrow frame of the display panel.

It should be noted that, the two touch drive waveform generation circuits 222 connected with each touch drive electrode can also include a plurality of shared touch drive waveform generation sub-circuits 222a, and this is not limited herein.

Figure 10:
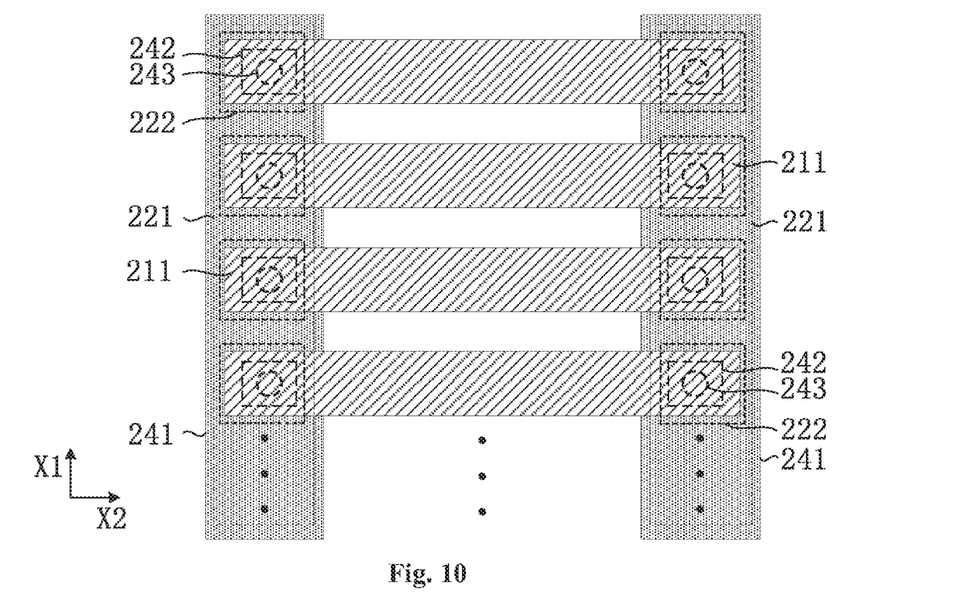
FIG. 10 is a schematic diagram of a structure of another display panel, according to embodiments of the disclosure.

As shown in FIG. 8A, the two touch drive waveform generation circuits 222 connected with each touch drive electrode 211 are located at the same end of the touch drive electrode 211. However, in another example, as shown in FIG. 10, two touch drive waveform generation circuits 222 connected with each touch drive electrode 211 are alternatively located at two ends of the touch drive electrode 211. Here, each group of waveform generation circuits 221 includes one kind of touch drive waveform generation circuit 222, which is used for generating one kind of touch drive signal.

Figure 11A:
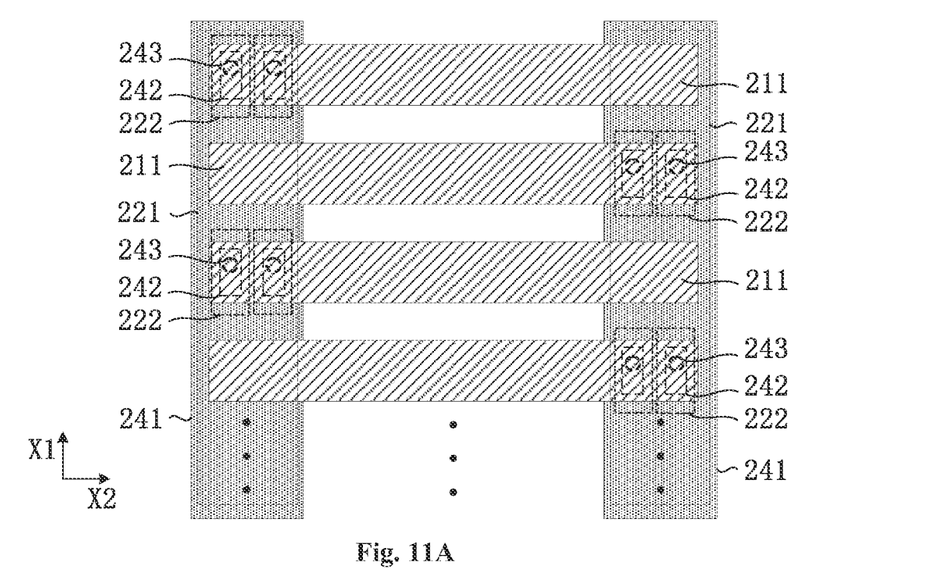
FIG. 11A is a schematic diagram of a structure of another display panel, according to embodiments of the disclosure.
Figure 11B:
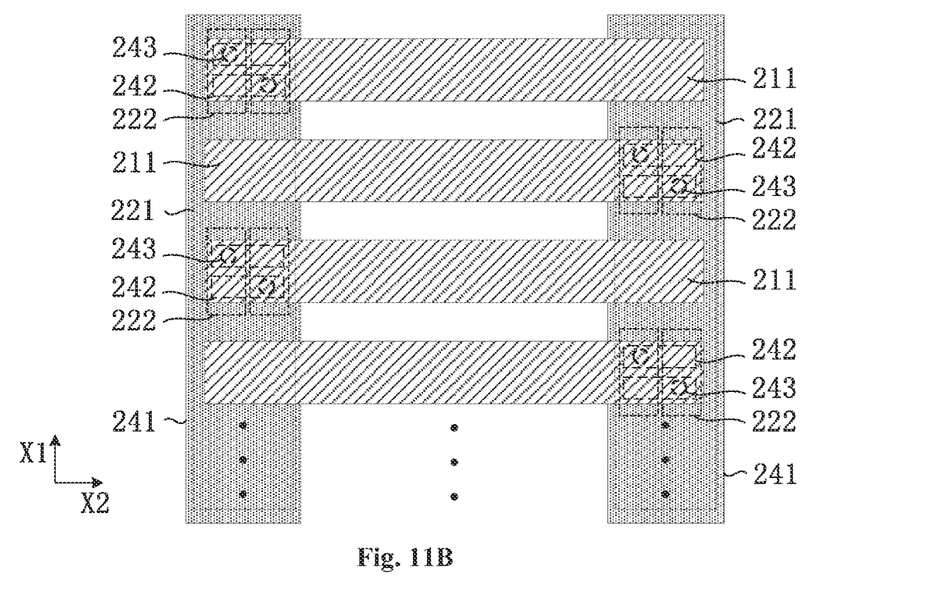
FIG. 11B is a schematic diagram of a structure of another display panel, according to embodiments of the disclosure.

As shown in FIG. 8A, each touch drive electrode 211 is electrically connected with two touch drive waveform generation circuits 222, which are arranged along the first direction X1 and extend along the extension direction X2 of the touch drive electrode 211, and two touch drive waveform output ends 242 corresponding to the two touch drive waveform generation circuits 222 are also arranged along the first direction X1 and extend along the extension direction X2 of the touch drive electrode 211. Some examples of arranging the touch drive waveform generation circuits 222 and the corresponding touch drive waveform output ends 242 have been described above. In other examples, as shown in FIG. 11A, the touch drive electrode 211 is electrically connected, through the conductive frame adhesive 241, with the touch drive waveform output ends 242 disposed at the side of the array substrate and located above the touch drive waveform generation circuits 222, and the touch drive waveform output ends 242 are electrically connected with the touch drive waveform generation circuits 222 through the via holes 243, where the touch drive electrode 211 is electrically connected with two touch drive waveform generation circuits 222 which are arranged along the extension direction X2 of the touch drive electrode 211 and extend along the first direction X1, and the two touch drive waveform output ends 242 corresponding to the touch drive waveform generation circuits 222 are also arranged along the extension direction X2 of the touch drive electrode 211 and extend along the first direction X1; or as shown in FIG. 11B which is different from FIG. 11A, the two touch drive waveform output ends 242 corresponding to the touch drive waveform generation circuits 222 are arranged along the first direction X1 and extend along the extension direction X2 of the touch drive electrode 211.

It should be noted that, the FIG. 8A, FIG. 10, FIG. 11A and FIG. 11B show the electric connection of one touch drive electrode to two touch drive waveform generation circuits and the arrangement of the two touch drive waveform generation circuits and the corresponding touch drive waveform output ends, but the present disclosure is also applicable to the electric connection of one touch drive electrode to one or more than two touch drive waveform generation circuits and the arrangement of one or more than two touch drive waveform generation circuits and the corresponding touch drive waveform output ends, and this is not limited herein.

In embodiments of the disclosure where the touch drive electrode is electrically connected with a plurality of touch drive waveform generation circuits, when one of the touch drive waveform generation circuits operates to provide a touch drive signal to the touch drive electrode, the touch drive waveform output ends corresponding to the rest of the touch drive waveform generation circuits electrically connected with the touch drive electrode are at a high impedance state.

A touch drive waveform output end being at the high impedance state refers to that the touch drive waveform output end does not output a touch drive signal or the touch drive waveform outputs a touch drive signal much weaker than the touch drive signal expected to be received by the touch drive electrode at this time. The high impedance state of the touch drive waveform output end can be achieved in such a way that: a switch is disposed between the touch drive waveform generation circuit and the corresponding touch drive waveform output end, where the switch can be a level switch, a thin-film transistor or other means having a switch function, which is not limited herein. The following description is given by taking an example where the switch is formed by an NMOS TFT, where a gate electrode of the NMOS TFT is used for receiving a control signal, a source electrode or a drain electrode of the NMOS TFT is electri-
cally connected with the touch drive waveform generation circuit, while the drain electrode or the source electrode of the NMOS TFT is electrically connected with the touch drive waveform output end corresponding to the touch drive waveform generation circuit. To provide a touch drive signal to the touch drive electrode from a touch drive waveform generation circuit, a high-level control signal is applied to the gate electrode of the NMOS TFT electrically connected with the touch drive waveform generation circuit, thus the NMOS TFT is turned on so that the touch drive signal generated by the touch drive waveform generation circuit is transmitted to the touch drive electrode through the corresponding touch drive waveform output end; meanwhile a low-level control signal is applied to the gate electrodes of the NMOS TFTs corresponding to the rest of the touch drive waveform generation circuits electrically connected with the touch drive electrode, in this way, the rest of the touch drive waveform generation circuits are disconnected from the respective touch drive waveform output ends, and the respective touch drive waveform output ends are at the high impedance state due to the absence of the touch drive signal.

It should be noted that, to achieve the touch control function in the above-described display panel, the display panel is required to be further provided with a plurality of touch sensing electrodes, which can be disposed on the surface at the side of the color filter substrate away from the liquid crystal layer and intersect a plurality of touch drive electrodes, so as to achieve the touch control function of the display panel by means of the mutual capacitance formed between the touch sensing electrodes and the touch drive electrodes.

In embodiments of the disclosure, the operating state of the display panel includes a displaying state and a touch control state, which operate in a time sharing mode or a simultaneous mode.

The displaying state is generally a normal state for the display panel. At the displaying state, the touch drive electrode is applied with a common voltage signal or is grounded; at the touch control state, the displaying state is terminated and the touch drive signal is applied to the touch drive electrode. That is, the displaying state and the touch control state operate in the time sharing mode. Since the touch drive electrode is applied with the common voltage signal or is grounded at the displaying state, the influence of the touch drive signal remaining at the touch drive electrode after the touch control state on the rotation of liquid crystal molecules at the displaying state can be prevented, thus the display effect of the display panel can be ensured.

Besides the time sharing mode adopted for the displaying state and the touch control state, a simultaneous mode can also be adopted for the displaying state and the touch control state. At the displaying state, the touch drive electrode is applied with a common voltage signal or is grounded, and when a touch occurs, the displaying state is not terminated, that is, the display panel operates in both the displaying state and the touch control state at the same time, resulting in the simultaneous mode of the displaying state and the touch control state. Further, when the display panel operates in both the displaying state and the touch control state at the same time, the touch drive signal is applied to the touch drive electrode to achieve the touch control function.

Since capacitance is formed between the touch drive electrode and the pixel electrode as well as the common electrode disposed in the array substrate, and when the touch drive signal is applied to the touch drive electrode at the touch control state, the capacitance formed between the touch drive electrode and the common electrode will influence the rotation of the liquid crystal molecules, preferably the time sharing mode is adopted for the displaying state and the touch control state of the display panel in order to prevent the above-mentioned influence on the rotation of the liquid crystal molecules.

In embodiments of the disclosure, for the simultaneous mode adopted for the displaying state and the touch control state, the liquid crystal molecules in the liquid crystal layer are negative liquid crystal molecules. Given that the dielectric constant of the negative liquid crystal molecules is smaller than that of positive liquid crystal molecules, if the liquid crystal molecules in the liquid crystal layer are the negative liquid crystal molecules for the simultaneous mode adopted for the displaying state and the touch control state, the capacitance formed between the touch drive electrode and the common electrode as well as the pixel electrode disposed in the array substrate can be decreased, so that the influence of the touch control state in the simultaneous mode on the display effect of the display panel can be reduced.

Figure 12:
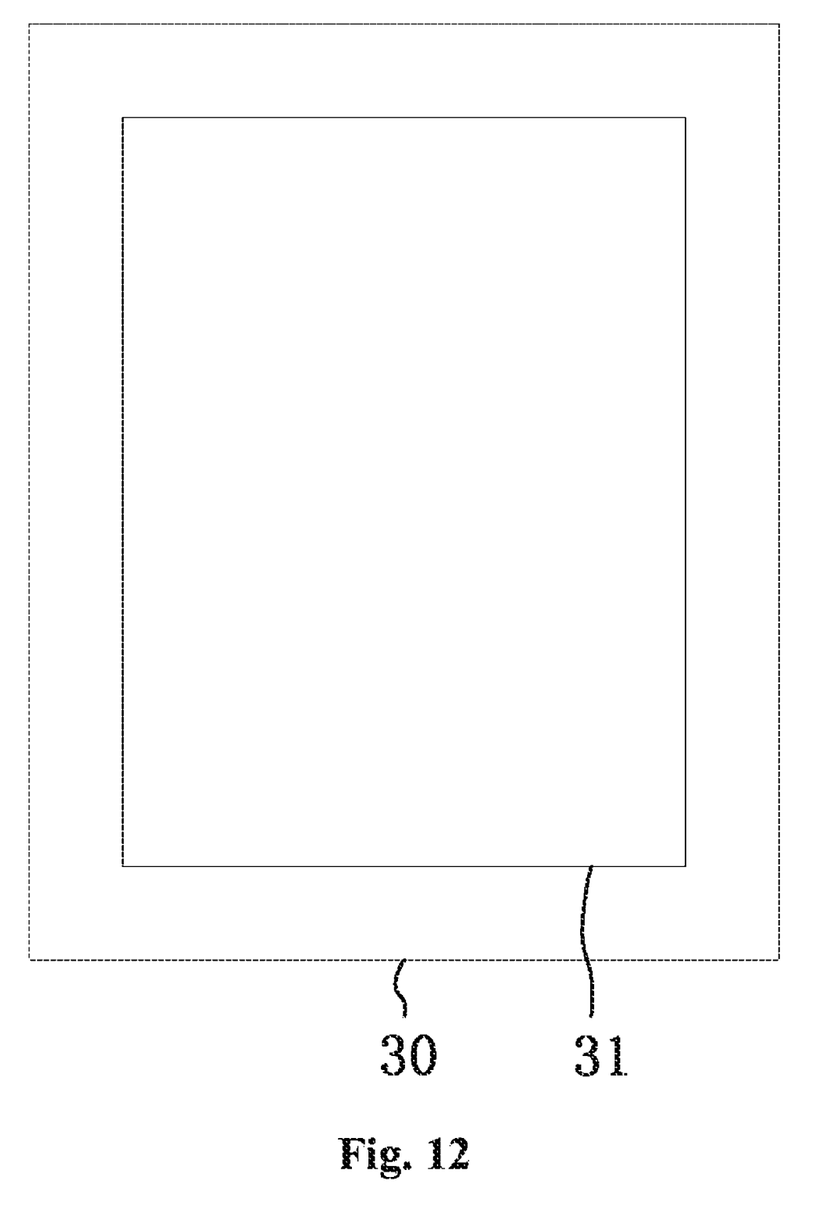
FIG. 12 is a schematic diagram of a structure of a display device, according to embodiments of the disclosure.

Embodiments of the disclosure provide a display device. FIG. 12 is a schematic diagram of a structure of a display device, according to embodiments of the disclosure. As shown in FIG. 12, the display device 30 includes a display panel 31, and may further include other components used for supporting the normal working of the display panel 31, where the display panel 31 is the display panel described in the above embodiments. The display device 30 can be a mobile phone, a desktop computer, a laptop computer, a tablet computer, an electronic album, electronic paper, etc.

In the display panel and the display device provided by embodiments of the disclosure, the touch drive electrode is arranged in the color filter substrate, thus the distance between the touch drive electrode and the source electrode of the thin-film transistor as well as the first metal disposed in the array substrate is increased, and hence the load capacitance formed between the touch drive electrode and the source electrode as well as the first metal is decreased, so that the product of the resistance of the touch drive electrode and the load capacitance is decreased, and the charging time for the touch drive signal is shortened. Accordingly, the touch drive waveform generation circuit can be smaller in the frame area, and in this way, the area of the frame area can be decreased, so that it is easy to achieve the narrow frames of the display panel and the display device. Further, since two groups of waveform generation circuits are disposed in the frame area of the array substrate and are respectively disposed at both ends of the touch drive electrode, the area of the frame area can be further decreased, thus it is easier to achieve the narrow frames of the display panel and the display device.

It should be noted that, embodiments and adopted technical principles of the disclosure have been described as above. Those skilled in the art will appreciate that the disclosure is not limited to the embodiments described herein, and variations, readjustments and substitutions can be made by those skilled in the art without departing from the protection scope of the disclosure. Thus, although the disclosure has been described in detail in combination with the above embodiments, the disclosure is not limited to the above embodiments, and can further include more other embodiments without departing from the conception of the disclosure.

Various modifications and additions can be made to the exemplary embodiments discussed without departing from the scope of the disclosure. For example, while the embodiments described above refer to particular features, the scope of this disclosure also includes embodiments having different combinations of features and embodiments that do not include all of the described features. Accordingly, the scope of the disclosure is intended to embrace all such alternatives, modifications, and variations as fall within the scope of the claims, together with all equivalents thereof.

We claim:

1. A display panel, comprising a color filter substrate, an array substrate disposed opposite to the color filter substrate and a liquid crystal layer located between the color filter substrate and the array substrate, wherein, the color filter substrate comprises a plurality of touch drive electrodes which are parallelly arranged along a first direction;

the array substrate comprises two groups of waveform generation circuits located in a frame area of the array substrate, and the two groups of waveform generation circuits are respectively arranged at both ends of the touch drive electrodes, where each group of waveform generation circuits comprises a plurality of touch drive waveform generation circuits, the touch drive electrode is electrically connected with one or more of the touch drive waveform generation circuits, and the plurality of touch drive waveform generation circuits are configured for generating touch drive signals and providing the generated touch drive signals to the touch drive electrodes.

2. The display panel of claim 1, wherein the color filter substrate further comprises a black matrix and a color filter layer;

the touch drive electrode is located on a surface at a side of the black matrix away from the color filter layer; or the touch drive electrode is located between the black matrix and the color filter layer; or the touch drive electrode is located on a surface at a side of the color filter layer away from the black matrix.

3. The display panel of claim 2, wherein the touch drive electrode has a bar shape.

4. The display panel of claim 1, wherein the color filter substrate further comprises a black matrix, the touch drive electrode has a grid shape, and a projection of the black matrix covers a projection of the touch drive electrode in the light transmittance direction.

5. The display panel of claim 4, wherein a grid unit of the touch drive electrode surrounds at least one opening of the black matrix.

6. The display panel of claim 4, wherein the touch drive electrode is made of metal.

7. The display panel of claim 1, wherein the plurality of touch drive waveform generation circuits in each group of waveform generation circuits are parallelly arranged along the first direction, and each of the touch drive waveform generation circuits extends along an extension direction of the touch drive electrode to be electrically connected with the touch drive electrode.

8. The display panel of claim 1, wherein each of the plurality of touch drive electrodes is connected with one touch drive waveform generation circuit, and the plurality of touch drive waveform generation circuits are configured to generate identical touch drive signals.

9. The display panel of claim 8, wherein one touch drive electrode or at least two adjacent touch drive electrodes form a group of touch drive electrodes; one of the two groups of waveform generation circuits is electrically connected with odd-numbered groups of touch drive electrodes, and the other one of the two groups of waveform generation circuits is electrically connected with even-numbered groups of touch drive electrodes.

10. The display panel of claim 1, wherein each of the plurality of touch drive electrodes is connected with two of the plurality of touch drive waveform generation circuits, and the two touch drive waveform generation circuits connected with each of the plurality of touch drive electrodes are configured to generate different touch drive signals comprising:

touch drive signals with different waveforms or touch drive signals with waveforms of different phases.

11. The display panel of claim 10, wherein the two touch drive waveform generation circuits connected with each touch drive electrode are located at one end of the touch drive electrode.

12. The display panel of claim 11, wherein the two touch drive waveform generation circuits connected with each touch drive electrode comprise one or more shared touch drive waveform generation sub-circuits.

13. The display panel of claim 10, wherein the two touch drive waveform generation circuits connected with each touch drive electrode are located at both ends of the touch drive electrode.

14. The display panel of claim 13, wherein each group of waveform generation circuit comprises one kind of touch drive waveform generation circuits.

15. The display panel of claim 1, wherein the touch drive electrode is electrically connected with a touch drive waveform output end disposed in the array substrate and located above the touch drive waveform generation circuit through a conductive frame adhesive, and the touch drive waveform output end is electrically connected with the touch drive waveform generation circuit through a via hole.

16. The display panel of claim 15, wherein the touch drive electrode is electrically connected with a plurality of the touch drive waveform generation circuits, and a plurality of touch drive waveform output ends electrically connected with the same touch drive electrode are arranged along the first direction or along the extension direction of the touch drive electrode.

17. The display panel of claim 1, wherein the touch drive electrode is electrically connected with a plurality of the touch drive waveform generation circuits, and when one of the touch drive waveform generation circuits electrically connected with the touch drive electrode provides the touch drive signal to the touch drive electrode, the touch drive waveform output ends corresponding to the rest touch drive waveform generation circuits electrically connected with the touch drive electrode are at a high impedance state.

18. The display panel of claim 1, wherein operating states of the display panel comprise a displaying state and a touch control state, which operate in a time division mode or a simultaneous mode.

19. The display panel of claim 18, wherein if the simultaneous mode is adopted for the displaying state and the touch control state, and liquid crystal molecules in the liquid crystal layer are negative liquid crystal molecules.

20. The display panel of claim 18, wherein if the time division mode is adopted for the displaying state and the touch control state, the touch drive electrode is applied with a common voltage signal or is grounded at the displaying state;

at the touch control state, the touch drive signal is applied to the touch drive electrode.

21. A display device, comprising the display panel comprising a color filter substrate, an array substrate disposed opposite to the color filter substrate and a liquid crystal layer located between the color filter substrate and the array substrate, wherein, the color filter substrate comprises a plurality of touch drive electrodes which are parallelly arranged along a first direction;

the array substrate comprises two groups of waveform generation circuits located in a frame area of the array substrate, and the two groups of waveform generation circuits are respectively arranged at both ends of the touch drive electrodes, where each group of waveform generation circuits comprises a plurality of touch drive waveform generation circuits, the touch drive electrode is electrically connected with one or more of the touch drive waveform generation circuits, and the plurality of touch drive waveform generation circuits are configured for generating touch drive signals and providing the generated touch drive signals to the touch drive electrodes.

* * * * *